United States Patent [19]
Wolf et al.

[11] Patent Number: 5,765,146
[45] Date of Patent: Jun. 9, 1998

[54] METHOD OF PERFORMING A PARALLEL RELATIONAL DATABASE QUERY IN A MULTIPROCESSOR ENVIRONMENT

[75] Inventors: Joel Leonard Wolf, Katonah; Philip Shi-lung Yu, Chappaqua; John Joseph Edward Turek, Nyack, all of N.Y.

[73] Assignee: International Business Machines Corporation, Armonk, N.Y.

[21] Appl. No.: 148,769

[22] Filed: Nov. 4, 1993

[51] Int. Cl.$^6$ .................................................. G06F 17/30
[52] U.S. Cl. .................................................. 707/2; 395/675
[58] Field of Search ........................ 364/DIG. 1, DIG. 2; 395/600, 200, 650, 200.43, 200.44, 200.45, 670, 672, 673, 675; 707/1-3, 101; 711/147, 148, 153

[56] References Cited

U.S. PATENT DOCUMENTS

| | | | |
|---|---|---|---|
| 4,497,039 | 1/1985 | Kitakami et al. | 364/900 |
| 4,769,772 | 9/1988 | Dwyer | 364/300 |
| 5,043,872 | 8/1991 | Cheng et al. | 364/200 |
| 5,121,494 | 6/1992 | Dias et al. | 395/600 |
| 5,166,674 | 11/1992 | Baum et al. | 340/825.07 |
| 5,191,578 | 3/1993 | Lee | 370/63 |

FOREIGN PATENT DOCUMENTS

| | | | |
|---|---|---|---|
| 2235798 | 3/1991 | United Kingdom | G06F 15/40 |

OTHER PUBLICATIONS

Blasgen et al., "Storage and Access in Relational Data Bases", *IBM Systems Journal*, vol. 16, No. 4, 1977, pp. 363–377.

Chen et al., "Schema Integration and Query Decomposition in a Distributed Database System Using a Knowledge Based Approach", *Information Modelling and Knowledge Bases III: Foundations, Theory and Applications*, 1992, pp. 567–585.

Chen et al., "Two–Step Approach to Optimize Parallel Execution of Multi–Join Queries", *IBM Technical Disclosure Bulletin*, vol. 34, No. 10B, Mar. 1992, pp. 79–81.

Date, *An Introduction to Database Systems*, vol. 1, 4th Edition, 1986, pp. 132–136, 266–268, 341–343, 348–349.

DeWitt et al., "The Gamma Database Machine Project", *IEEE Transactions on Knowledge and Data Engineering*, vol. 2, No. 1, Mar. 1990, pp. 44–62.

Dias et al., "Methods for Improving the Efficiency of Parallel Sort Merge Joins in the Presence of Data Skew", *IBM Technical Disclosure Bulletin*, vol. 33, No. 10A, Mar. 1991, pp. 166–170.

(List continued on next page.)

*Primary Examiner*—Thomas G. Black
*Assistant Examiner*—M. N. Von Buhr
*Attorney, Agent, or Firm*—W. A. Kinnaman, Jr.

[57] ABSTRACT

A method of performing a parallel join operation on a pair of relations R1 and R2 in a system containing P processors organized into Q clusters of P/Q processors each. The system contains disk storage for each cluster, shared by the processors of that cluster, together with a shared intermediate memory (SIM) accessible by all processors. The relations R1 and R2 to be joined are first sorted on the join column. The underlying domain of the join column is then partitioned into P ranges of equal size. Each range is further divided into M subranges of progressively decreasing size to create MP tasks $T_{m,p}$, the subranges of a given range being so sized relative to one another that the estimated completion time for task $T_{m,p}$ is a predetermined fraction that of task $T_{m-1,p}$. Tasks $T_{m,p}$ with larger time estimates are assigned (and the corresponding tuples shipped) to the cluster to which processor p belongs, while tasks with smaller time estimates are assigned to the SIM, which is regarded as a universal cluster (cluster 0). The actual task-to-processor assignments are determined dynamically during the join phase in accordance with the dynamic longest processing time first (DLPT) algorithm. Each processor within a cluster picks its next task at any given decision point to be the one with the largest time estimate which is owned by that cluster or by cluster 0.

8 Claims, 5 Drawing Sheets

OTHER PUBLICATIONS

Hummel et al., "Factoring: A Method for Scheduling Parallel Loops", *Communications of the ACM*, vol. 35, No. 8, Aug. 1992, pp. 90–101.

Kruskal et al., "Allocating independent Subtasks on Parallel Processors", *IEEE Transactions on Software Engineering*, vol. SE-11, No. 10, Oct. 1985, pp. 1001–1016.

Murphy et al., "Effective Resource Utilization for Multiprocessor Join Execution", *Proceedings of the 15th International Conference on Very Large Data Bases*, 1989, pp. 67–75.

Murphy et al. "Processor Scheduling for Multiprocessor Joins", *Fifth International Conference on Data Engineering*, 1991, pp. 140–148.

Polychronopoulos et al., "Guided Self–Scheduling: A Practical Scheduling Scheme for Parallel Supercomputers", *IEEE Transactions on Computers*, vol. C-36, No. 12., Dec. 1987, pp. 1425–1439.

Schneider et al., "Tradeoffs in Processing Complex Join Queries via Hashing In Multiprocessor Database Machines", *Proceedings of the 16th VLDB Conference*, 1990, pp. 469–480.

Swami et al., "Online Algorithms for Load Balancing the Join Operation", *IBM Technical Disclosure Bulletin*, vol. 34, No. 7B, Dec. 1991, pp. 278–280.

Tseng et al., "Parallel Database Processing on the KSR1 Computer", *Sigmod Record*, vol. 22, no. 2, Jun. 1993, pp. 353–455.

Tzen et al., "Trapezoid Self–Scheduling: A Practical Scheduling Scheme for Parallel Compilers", *IEEE Transactions on Parallel and Distributed Systems*, vol. 4, No. 1., Jan. 1993, pp. 87–98.

Walton et al., "Data Skew and the Scalability of Parallel Joins", *Proceedings of the Third IEEE Symposium on Parallel and Distributed Processing*, 1991, pp. 44–51.

Wolf et al., "A Parallel Sort Merge Join Algorithm for Managing Data Skew", *IEEE Transactions on Parallel and Distributed Systems*, vol. 4, No. 1, Jan. 1993, pp. 70–86.

Wolf et al., "An Effective Algorithm for Parallelizing Hash Joins in the Presence of Data Skew", *Proceedings of the Seventh International Conference on Data Engineering*, 1991, pp. 200–209.

Wolf et al., "An Effective Algorithm for Parallelizing Sort Merge Joins in the Presence of Data Skow", *Proceedings of the Second International Symposium on Databases in Parallel and Distributed Systems*, 1990, pp. 103–115.

Wolf et al., "Using a Surrogate Median to Speed Up the Execution of a Parallel Sort Merge Join Algorithm", *IBM Technical Disclosure Bulletin*, vol. 33, No. 9, Feb. 1991, pp. 215–217.

METHOD OF PERFORMING A PARALLEL RELATIONAL DATABASE QUERY IN A MULTIPROCESSOR ENVIRONMENT

CROSS-REFERENCE TO RELATED APPLICATIONS

This application is related to the following commonly owned, concurrently filed applications, the specifications of which are incorporated herein by reference:

T. Borden, I. S. Narang, D. B. Rathi and D. J. Wisneski, "System and Method for Parallel Processing of Complex Read-Only Database Queries", Ser. No. 08/148,091, now U.S. Pat. No. 5,495,606;

J. L. Wolf, P. S. Yu. and J. J. Turek, "Task Scheduler for a Multiprocessor System", Serial No. 08/148,108, now abandoned in favor of continuation application Ser. No. 08/293,257, filed Aug. 19, 1994, now U.S. Pat. No. 5,437,032.

BACKGROUND OF THE INVENTION

Field of the Invention

This invention relates generally to a method of performing a parallel query in a multiprocessor environment and, more particularly, to a method for performing such a query with load balancing in an environment with shared disk clusters, shared intermediate memory or both.

Description of the Related Art

A common operation in relational database systems is the join of two relations on respective columns defined over a common domain. See, for example, the description of joins in C. J. Date, *An Introduction to Database Systems*, vol. 1 (4th ed. 1986), at pp. 132–136, 266–268, 341–343 and 348–349. The result of the join is a new relation in which each row is the concatenation of two rows, one from each of the original relations, such that both rows have the same value in their respective join columns.

One popular algorithm for computing the join of two relations is the sort merge technique as described by M. W. Blasgen et al. in "Storage and Access in Relational Databases", *IBM Systems Journal*, vol. 16, no. 4, pp. 363–377 (1977). It can be summarized briefly as follows: First, each of the relations is sorted (if necessary) according to the join column. Second, the two sorted relations are scanned in the obvious interlocked sequence and merged for rows which have equal values. In a multiprocessor system, this algorithm may be implemented by partitioning the join into independent tasks which are performed in parallel by the processors.

Another popular algorithm for computing the join of two relations is the hash join technique described by D. J. DeWitt et al. in "Multiprocessor Hash-Based Join Algorithms", *Proceedings of the 11th International Conference on Very Large Databases*, pp. 151–164 (1985). For a multiprocessor system, it can be summarized briefly as follows: First, both relations are hashed (if necessary) into hash partitions according to the join columns. The number of hash partitions generally is set equal to the number of processors. Then the hash partitions are distributed among the processors, so that the corresponding partitions of the two relations reside on the same processor. The corresponding hash partitions of the two relations are then joined together.

Although the execution of a join query using either of these methods may be sped up by the use of multiple processors, the speedup can be very limited in the presence of data skew, as may be appreciated from the following example of a parallel system architecture.

Referring to FIG. 1, consider a database architecture 100 consisting of P processors 104 in which there is sharing of either or both of the following types:

1. The processors 104 are divided into $Q \leq P$ equal-size clusters 102, with P/Q processors per cluster. Within each cluster 102, all disks 106 are shared by all of the processors 104. (The case Q=1 corresponds to a data-sharing architecture, and the case P=Q would correspond to a shared-nothing architecture. When $1<Q<P$ the architecture can be characterized as hybrid.)

2. There is a single shared intermediate memory (SIM) 108 accessible by all of the processors.

FIG. 1 depicts an architecture in which both of the above types of sharing are present. Suppose it is desired to perform a parallel join or other parallel query in this environment. Without knowing the underlying distribution of tuples in the two relations being joined, it is impossible to partition the underlying domain into tasks in such a way that the load in the final (join) phase is guaranteed to be balanced. Even if the actual amount of work for each task happens to be equal, there may be stochastic variations in individual processor speeds due to external events, and this nonhomogeneity will also lead to load imbalances.

D. M. Dias et al., in U.S. Pat. No. 5,121,494 entitled "Joining Two Database Relations on a Common Field in a Parallel Relational Database Field" (Jun. 9, 1992), disclose a method of parallelizing a join operation in a shared-nothing architecture in which additional subtasks are created by partitioning existing tasks and assigned to less busy processors if a load imbalance is sensed. Similar methods are described in the following references:

J. L. Wolf et al., "An Effective Algorithm for Parallelizing Sort Merge Joins in the Presence of Data Skew", *Proceedings of the Second International Symposium on Databases in Parallel and Distributed Systems*, pp. 103–115 (1990);

D. M. Dias et al., "Methods for Improving the Efficiency of Parallel Sort Merge Joins in the Presence of Data Skew", *IBM Technical Disclosure Bulletin*, vol. 33, no. 10A, pp. 166–170 (March 1991);

J. Wolf et al., "An Effective Algorithm for Parallelizing Hash Joins in the Presence of Data Skew", *Proceedings of the Seventh International Conference on Data Engineering*, pp. 200–209 (1991);

J. L. Wolf et al., "A Parallel Sort Merge Join Algorithm for Managing Data Skew", *IEEE Transactions on Parallel and Distributed Systems*, vol. 4, no. 1, pp. 70–86 (January 1993).

While the techniques described in these references do ameliorate the problem of data skew, it would be desirable to have a parallelization method which does not require the creation of new tasks.

SUMMARY OF THE INVENTION

The invention described here relates to a parallel query method which has a high likelihood of balancing the load well in the face of either initial load imbalance due to data skew or later load imbalance due to stochastic process variations. The invention is described in the context of a sort merge join. However, the same basic method can also be applied to hash joins, sorts, or other queries in a natural manner.

In a parallel sort merge join, the relations to be joined are first sorted, in parallel, within their clusters 102 (FIG. 1). In a naive parallel sort merge join, the underlying join column domain might be partitioned into P ranges of equal size, and the tuples transferred accordingly among the clusters 102. However, given a nonuniform distribution of tuples across the underlying domain, there is no guarantee that the amount of join phase work will be equal.

In accordance with the present invention, each of the P ranges is further divided into a relatively small number M of components, creating MP tasks $T_{m,p}$ in all. These components intentionally have nonequal task time estimates. For example, a reasonable approach would be to partition the tasks so that the estimated completion time of a task $T_{m,p}$ is half that of the previous task $T_{m-1,p}$. Assuming that the quadratic output term dominates the task time estimates, this can be done by partitioning the tasks in such a manner that the extent of the range of a given task $T_{m,p}$ (to which the number of tuples in the task is roughly proportional) is $1/\sqrt{2}$ times the number of tuples in task $T_{m-1,p}$. FIGS. 10A and 10B show an example of such a partitioning. FIG. 10A shows estimated task times as a function of m and p, and FIG. 10B shows actual task times, also as a function of m and p. The latter may be different from the former, and will not be known until the join phase, when the tasks are actually performed.

Cluster ownership of these tasks is assigned as follows: The tasks with larger time estimates (that is, those tasks $T_{m,p}$ with small values of m) are assigned to the cluster 102 to which processor p belongs. Thus, tasks $T_{m,p}$ with small m satisfying p=1 will be assigned to cluster 1, while tasks with small m satisfying p=P will be assigned to cluster Q. The tasks with smaller time estimates (large values of m) are assigned to SIM 108, which constitutes a universal cluster which is labeled cluster 0. The rule for determining which tasks are small and which are large depends on whether or not they fit into the SIM 108. Specifically, 1/P of the SIM 108 is allotted to each processor 108, and during the transfer phase the tuples are shipped to the SIM in order of increasing task time estimates until the allotted portion of the SIM is filled. Remaining tuples are shipped to a disk 106 within the cluster 102 that owns them. All tasks which fit completely within the SIM 108 are regarded as small, and the remainder are regarded as large.

In FIGS. 10A and 10B, the "dotted" tasks are owned by cluster 0, while the "shaded" tasks are owned by their respective clusters. Note again that the high values of m correspond to cluster 0, while the low values correspond to the other clusters.

The actual task-to-processor assignments are determined dynamically during the join phase, according to the following rule, which is a generalization of the standard dynamic longest processing first (DLPT) algorithm as described, for example, in T. Hu, *Combinatorial Algorithms* (1982). Each processor 104 within a cluster 102 picks its next task at any given decision point to be the one with the largest time estimate which is owned by that cluster or by the universal cluster 108. (A decision point occurs at initiation time or whenever a current task completes.) Thus it can be assumed that each task $T_{1,p}$ is performed by the corresponding processor p. After those tasks complete, the next tasks are picked dynamically. Although the task times may not be estimated with perfect precision and the speeds of the processors 104 may not be entirely homogeneous, the invention coupled with the flexibility inherent in the sharing provides a mechanism for limiting the join phase load imbalance.

Any database system supporting complex queries and employing clustered disk sharing and/or a shared intermediate memory can make use of this invention. There are no special implementation requirements other than the ability to create tasks and assign them dynamically.

DESCRIPTION OF THE PREFERRED EMBODIMENT

General System Architecture

Figures 1, 2, 3:
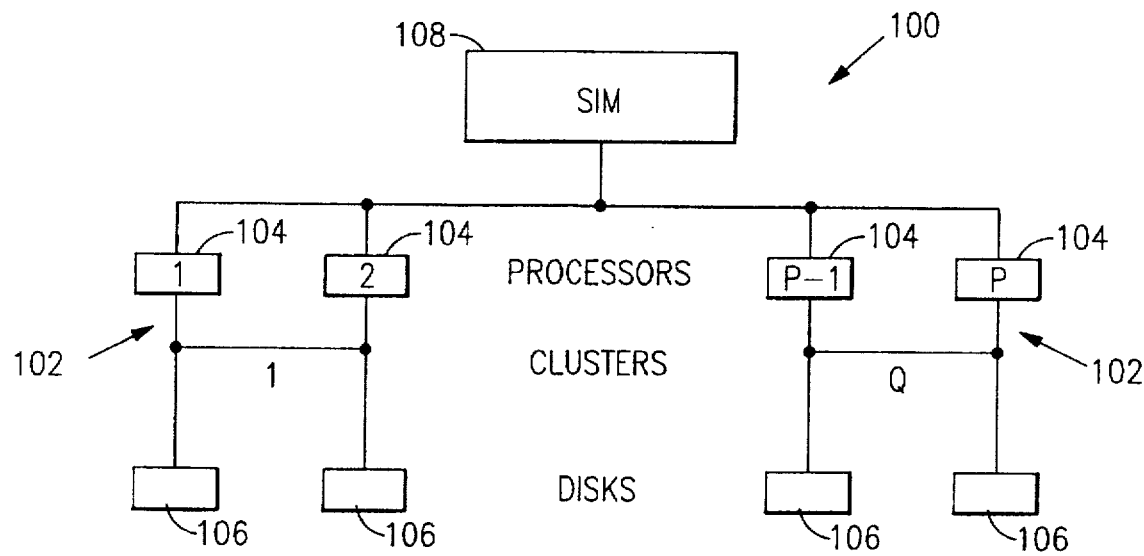
FIG. 1 is a schematic block diagram of a multiprocessor system incorporating the present invention.
FIGS. 2 and 3 illustrate a pair of relations which may be joined using the present invention.

Referring to FIG. 1, a multiprocessor system 100 incorporating the present invention includes P processors 104 organized into Q equal-size clusters 102, each cluster containing P/Q processors. Each processor 104 may be either a uniprocessor or a complex of tightly coupled processors (not separately shown) that, for the purposes of task assignment, are regarded as a single processor. Each cluster 102 also includes one or more direct access storage devices (DASD) 106, which are magnetic disk drives in the system 100 shown. Each processor 104 within a cluster 102 can access any storage device 106 in the same cluster, but cannot access any storage device in any other cluster 102. Processors 104 are interconnected to one another as well as to a single intermediate memory (SIM) 108, to which each processor has access. SIM 108 is also referred to herein as the universal cluster, or cluster 0. In addition to the memory 108 and storage devices 106 shown, each processor 104 also has its own main memory (not separately shown). In the case of a processor 104 comprising a tightly coupled processor complex, such main memory would be shared by the processors of the complex. The elements shown in FIG. 1 are conventional in the art, as are the interconnections between these elements.

Processors 104 are used for the concurrent parallel execution of tasks making up database queries, as described below. A query may originate either from one of the processors 104 or from a separate front-end query processor as described in the concurrently filed application of T. Borden et al., now U.S. Pat. No. 5,495,606. As further described in that application, within each cluster 102 the query splitting and scheduling steps described below may be performed by an additional processor or processors (not shown) similar to processors 104; such additional processors would not be counted among the P/Q processors 104 per complex 102 to which tasks are assigned.

Query Elements

Referring to FIGS. 2 and 3, a typical query may comprise a join operation performed on two database tables (or relations, in relational database terminology) such as tables 200 (EMPLOYEE) and 300 (DEPT). Table 200 (EMPLOYEE) lists for each employee of an organization the employee's name (NAME), the employee's department (DEPT) and the employee's salary (SALARY). Table 300 lists for each department of the organization the department name (DEPT) and the name of the manager of that department (MGR). Each table comprises a plurality of rows, also referred to as records or tuples. Each row in turn comprises one or more columns, also referred to as fields or attributes. Whereas the number of columns in a relation remains fixed, the number of rows (known as the cardinality of the relation) may vary as particular tuples are added or deleted. In the system 100, the tuples making up the database tables such as tables 200 and 300 are distributed among the storage devices 106 of the various clusters 102, so that different parts of each table generally reside on different clusters.

Each column of relations 200 and 300 has an underlying domain, which consists of the set of possible values for that column, irrespective of whether any tuples of the relation actually have that value in the column. For the relations 200 and 300 shown, the domains of each column would extend from A (one letter) to ZZZ ... ZZZ (n letters, where n is the field size). Similarly, a numerical column (not shown in FIGS. 2 and 3) might have a domain extending between two numerical values. In either case, since the value are ordered (alphabetically or numerically), it is possible to partition the domain (as described below) into ranges of contiguous values, such that each value (and hence the tuple containing that value) may be assigned to one and only one range.

In this particular example, it will be assumed that the query requests a listing by departments of department manager name, department and department manager's salary, ordered by department manager name. Expressed in Structured Query Language (SQL), a language widely used for database queries, this query takes the form:

TABLE 1

| Query 1 |
|---|
| 1    SELECT NAME, EMPLOYEE.DEPT, SALARY |
| 2    FROM EMPLOYEE, DEPT |
| 3    WHERE NAME = MGR |
| 4    ORDER BY NAME |

Line 1 of this query specifies the columns requested as output: in this case, the NAME, DEPT and SALARY columns of table 200 (EMPLOYEE). The notation EMPLOYEE.DEPT means that the DEPT column is to be taken from the EMPLOYEE table; otherwise, since DEPT appears in both tables, the specification would be ambiguous. The particular table from which the NAME and SALARY columns are taken need not be specified (although it may be specified), since these column names appear only in the EMPLOYEE table and hence there is no ambiguity.

Line 2 specifies that these columns are taken from the set of all tuples formed by concatenating a tuple from table 200 (EMPLOYEE) with a tuple from table 300 (DEPT). This set of tuples is known as the Cartesian product of tables 200 and 300.

Line 3 of the query, which is referred to as the predicate (the join predicate in this instance, since the query is a join), specifies that only those tuples of the Cartesian product for which the NAME column of the EMPLOYEE component is equal to the MGR column of the DEPT component are selected. Since in this case the join predicate specifies an equality, this type of query is known as an equijoin.

Finally, line 4 specifies that the output listing is to be sorted by the NAME column of the output listing.

In general, Query 1 may be partitioned into concurrently executed tasks by having each processor 104 process only that part of the query corresponding to particular values of one of the columns of a table, for example, table 200 (EMPLOYEE). More specifically, Query 1 may be partitioned into tasks corresponding to a particular range of one of the columns of table 200. Thus, if the underlying domain of the NAME column of table 200 (EMPLOYEE) extends from A from ZZZ ... ZZZ, the original query may be split into 26 independent tasks for concurrent execution, so that the first task, for example, might be as follows:

TABLE 2

| Task 1 |
|---|
| 1    SELECT NAME, EMPLOYEE.DEPT, SALARY |
| 2    FROM EMPLOYEE, DEPT |
| 3    WHERE NAME = MGR |
| 3a   AND A $\leq$ NAME < B |
| 4    ORDER BY NAME |

Lines 1–3 and 4 of task 1 are similar to lines 1–4 of query 1. Line 3a adds another condition to the predicate, namely, that only those tuples of the EMPLOYEE table for which NAME begins with A are considered.

The two conditions on lines 3–3a taken together imply that MGR is subject to the same range condition as NAME. Therefore, instead of having to consider the entire DEPT table, only those tuples for which A$\leq$MGR<B need be considered in this particular task. Task 1 might be restated, therefore, as follows:

| 1    SELECT NAME, EMPLOYEE.DEPT, SALARY |
|---|
| 2    FROM EMPLOYEE, DEPT |
| 3    WHERE NAME = MGR |
| 3a   AND A $\leq$ NAME < B |
| 3b   AND A $\leq$ MGR < B |
| 4    ORDER BY NAME |

Task 1 is equivalent to the original query as performed on subsets (or partitions) of the EMPLOYEE and DEPT tables 200 and 300 in which NAME and MGR begin with the letter A.

Other tasks into which Query 1 is divided would be similar in form to task 1, except that the additional condition would reference a different part of the EMPLOYEE and DEPT tables. Thus, task 2 might be:

| 1    SELECT NAME, EMPLOYEE.DEPT, SALARY |
|---|
| 2    FROM EMPLOYEE, DEPT |

```
    3   WHERE NAME = MGR
    3a  AND B ≦ NAME < C
    3b  AND B ≦ MGR < C
    4   ORDER BY NAME
while task 26 might be:
    1   SELECT NAME, EMPLOYEE.DEPT, SALARY
    2   FROM EMPLOYEE, DEPT
    3   WHERE NAME = MGR
    3a  AND NAME ≧ Z
    3b  AND MGR ≧ Z
    4   ORDER BY NAME
```

It may be readily verified that these tasks are mutually exclusive and that their results, when merged, replicate the results that would be obtained by performing the original unpartitioned query.

As can be inferred from the above example, the tasks into which tables 200 and 300 are partitioned, using a partitioning scheme of one task per processor, can vary widely in the number of tuples. For example, relatively few if any names start with X, whereas a great many may start with other letters such as E. Similar skew patterns may exist for other types of data (e.g., zip codes). Since the query completion time is determined by the time required to complete the longest task, such data skew can greatly prolong the query time, nullifying the benefits of parallelization.

Partitioning Procedure

Figure 4:
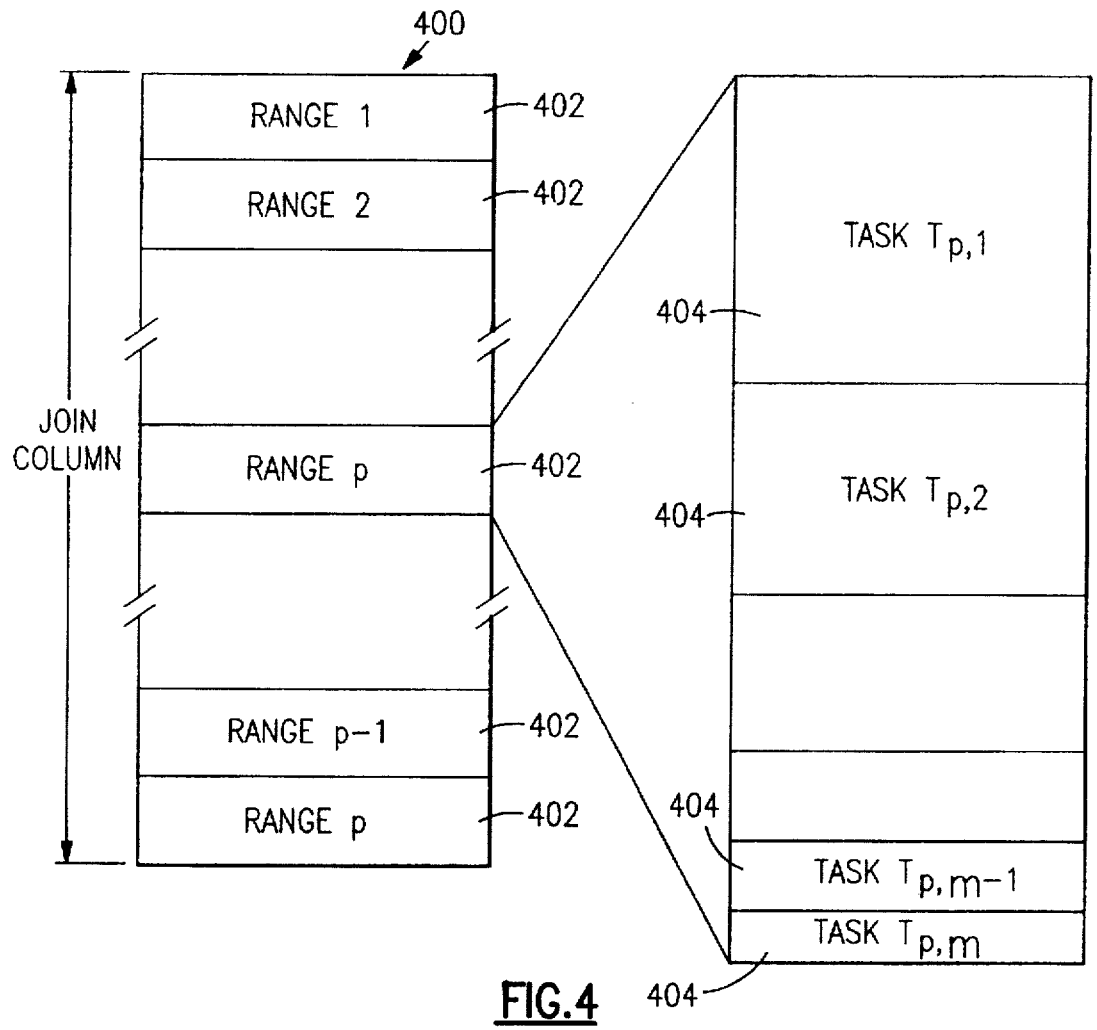
FIG. 4. illustrates the partitioning of a relation into a plurality of ranges comprising subranges of progressively decreasing extent.

Referring to FIG. 4, in accordance with the present invention, each table or relation 400 forming part of the query is first partitioned into P ranges p (402) of equal size, where P is the total number of processors 104 in the system 100 and 1≦p≦P. This partitioning is preferably performed on the basis of the underlying domain of a particular column of the relation (preferably the join column), not the actual number of tuples in a particular range. Thus, if NAME and MGR are the respective join columns for joining the EMPLOYEE table 200 (FIG. 2) and the DEPT table 300 (FIG. 3), as in the above example, the EMPLOYEE table may be divided into a first range consisting of those tuples for which NAME begins with the letter "A", a second range consisting of those tuples for which NAME begins with the letter "B", and so on, as already described. Correspondingly, the DEPT table 300 would be divided into a first range consisting of those tuples for which MGR begins with the letter "A", a second range consisting of those tuples for which MGR begins with the letter "B", and so on, as already described.

Next, each range p (402) into which a relation 400 forming part of the query has been partitioned is further divided into M subranges 404 to form tasks $T_{m,p}$ of progressively decreasing estimated task time, where 1≦m≦M. This division into subranges 404, like the original division into ranges 402, is preferably performed on the basis of the underlying column domain, not the actual number of tuples in a particular range. As a particular example, the ranges 402 might be divided in such a manner that each subrange m (404) has an extent in the underlying column domain that is $1/\sqrt{2}$ that of the preceding subrange m−1. Since the completion time for a join of two relations is roughly proportional to the product of the number of tuples in each relation, such a partitioning results in an estimated completion time for a task $T_{m,p}$ that is approximately half that of the preceding task $T_{m-1,p}$.

Figure 11:
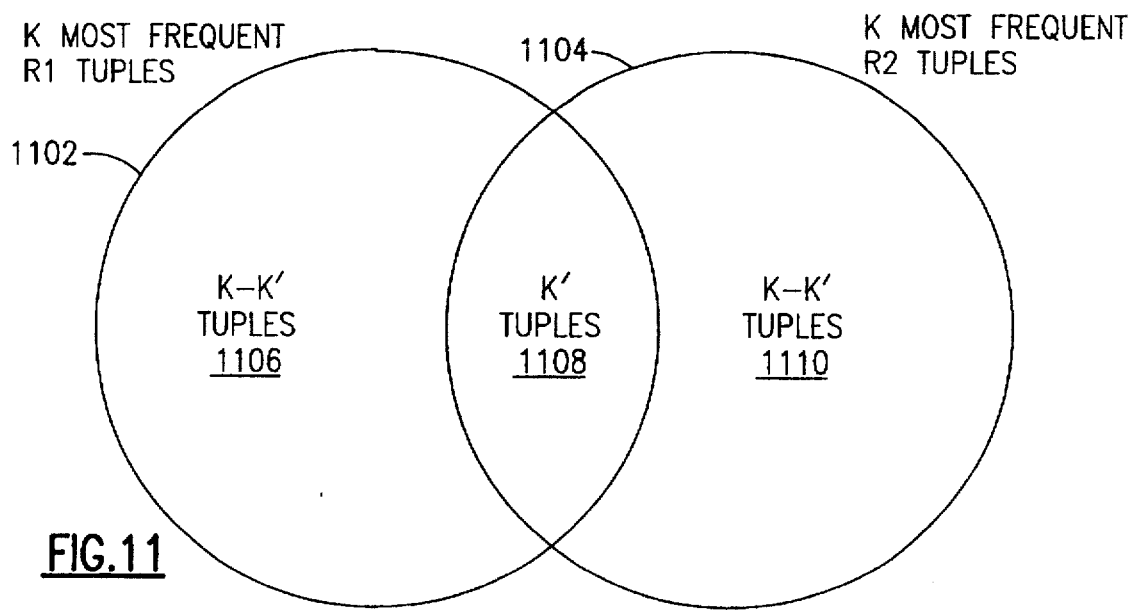
FIG. 11 is a Venn diagram of the K most frequent tuples in each of a pair of relations R1 and R2.

In the event that additional tuple cardinality information is available, the creation of these tasks can be slightly modified. For example, some database catalogs keep track of the cardinalities of the K most frequently occurring tuples for some small value of K. Thus, referring to FIG. 11, such a catalog may keep track of the K most frequently occurring tuples 1102 in a first relation R1, as well as the K most frequently occurring tuples 1104 in a second relation R2. If this information is available, there will be K' frequently occurring values 1108 (where 0≦K'≦K) for which the tuple cardinalities of both relations are known, and 2(K−K') values 1106, 1110 for which the tuple cardinality of one relation is known and the other is bounded from above. These latter values can either be estimated or determined explicitly during the sort phase, and those values with large enough task times turned into separate tasks. These tasks can even be split into multiple subtasks to be performed on several processors if necessary, as is described in J. L. Wolf et al. (1990) and J. L. Wolf et al. (1991), cited above.

Processors 104 are initially assigned those tasks having the largest estimated completion times. Upon the completion of a task by a processor, it is assigned an awaiting task having the largest estimated completion time, so that the tasks having the smallest estimated completion times are the last to be assigned. This allows the smaller tasks to be assigned in such a manner as to smooth out load imbalances that may develop among the processors 104. At the same time, having the initially performed tasks relatively large minimizes scheduling overhead.

Overall Query Procedure

Figure 5:
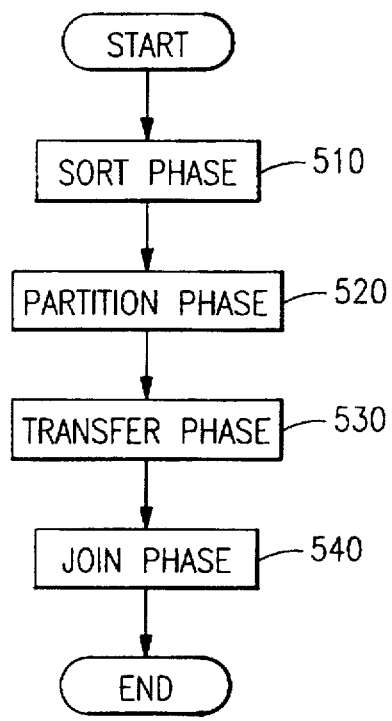
FIG. 5 is a flowchart of the overall sequence of operations of the system shown in FIG. 1.

Referring to FIG. 5, the overall query procedure is conveniently divided into four successive phases: a sort phase 510, a partition phase 520, a transfer phase 530, and a join phase 540. Each of these phases is performed in parallel within the clusters 102 (FIG. 1), with each cluster performing its portion of a particular phase as it relates to the tuples within the cluster.

Figure 6:
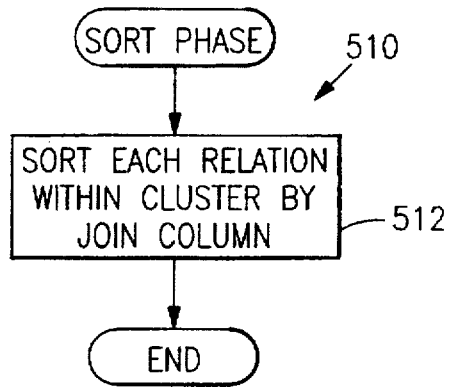
FIG. 6 is a flowchart of the sorting phase of the sequence shown in FIG. 5.

Referring to FIG. 6, in the sort phase 510, the tuples of each relation forming part of the query that are locally stored on a particular cluster 102 are sorted (if necessary) in accordance with the value in the column forming the basis for partitioning (step 512); in most instances, this column is preferably the join column. This sorting facilitates the partitioning of the relations in the next phase as well as their subsequent transfer, since the tuples of each partition are consecutively accessible.

Figure 7:
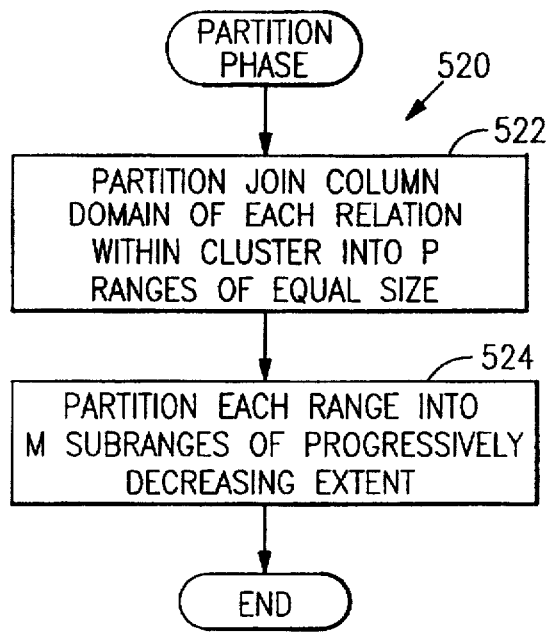
FIG. 7 is a flowchart of the partition phase of the sequence shown in FIG. 5.

Referring to FIGS. 4 and 7, in the partition phase 520, the join request is partitioned into P sets of M tasks $T_{m,p}$ of progressively decreasing estimated task time, for a total of MP tasks overall. In the case of an equijoin query (as in the above example), this may be accomplished by partitioning the join column domain of each relation 400 forming part of the query into P ranges p of equal size, as described above (step 522), and then further dividing each such range p into M subranges 404, also as described above (step 524). In general, however, any of a number of mechanisms may be used to partition the original query into sets of independent tasks of decreasing estimated task time for concurrent execution. A particular mechanism is described further below.

Figure 8:
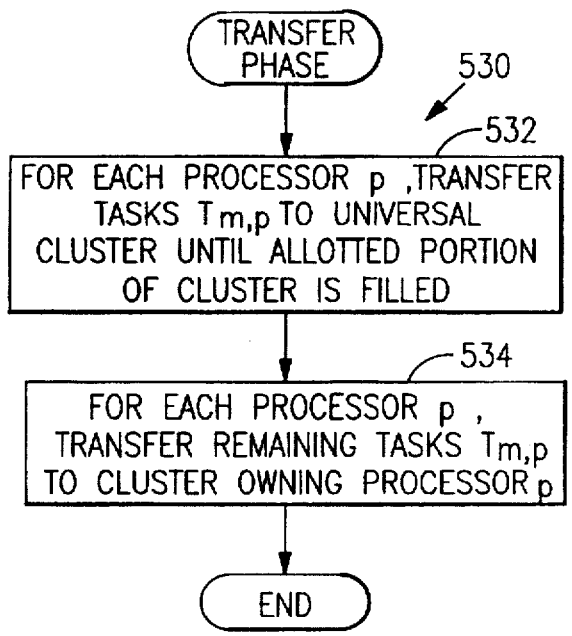
FIG. 8 is a flowchart of the transfer phase of the sequence shown in FIG. 5.

Referring now to FIG. 8, in the transfer phase 530, the portions of the tasks $T_{m,p}$ resident on a given cluster 102 (i.e., the actual tuples forming the corresponding partitions of the relations to be joined) are transferred to the clusters that will actually be processing them, or to the universal cluster (SIM) 108 (FIG. 1), depending on the relative task size. In general, as described more fully 10 below, "smaller"

tasks are transferred to the universal cluster 108, while "larger" tasks are transferred to a particular processor cluster 102.

Each processor 104 of the system 100 is allotted an equal portion 1/P of the memory capacity of universal is cluster 108. In the initial portion of the transfer phase, for each processor p (104) of the system 100, the tasks $T_{m,p}$ corresponding to that processor and residing on a particular cluster 102 are transferred from that cluster to the universal cluster 108, beginning with the task $T_{m,p}$ having the smallest estimated completion time and progressing in order of increasing task size (i.e., decreasing m), until the allotted portion 1/P is filled (step 532). The remaining tasks $T_{m,p}$ for each processor p (104) are transferred to the cluster 102 owning the processor, unless they are already resident there (step 534).

Figure 9:
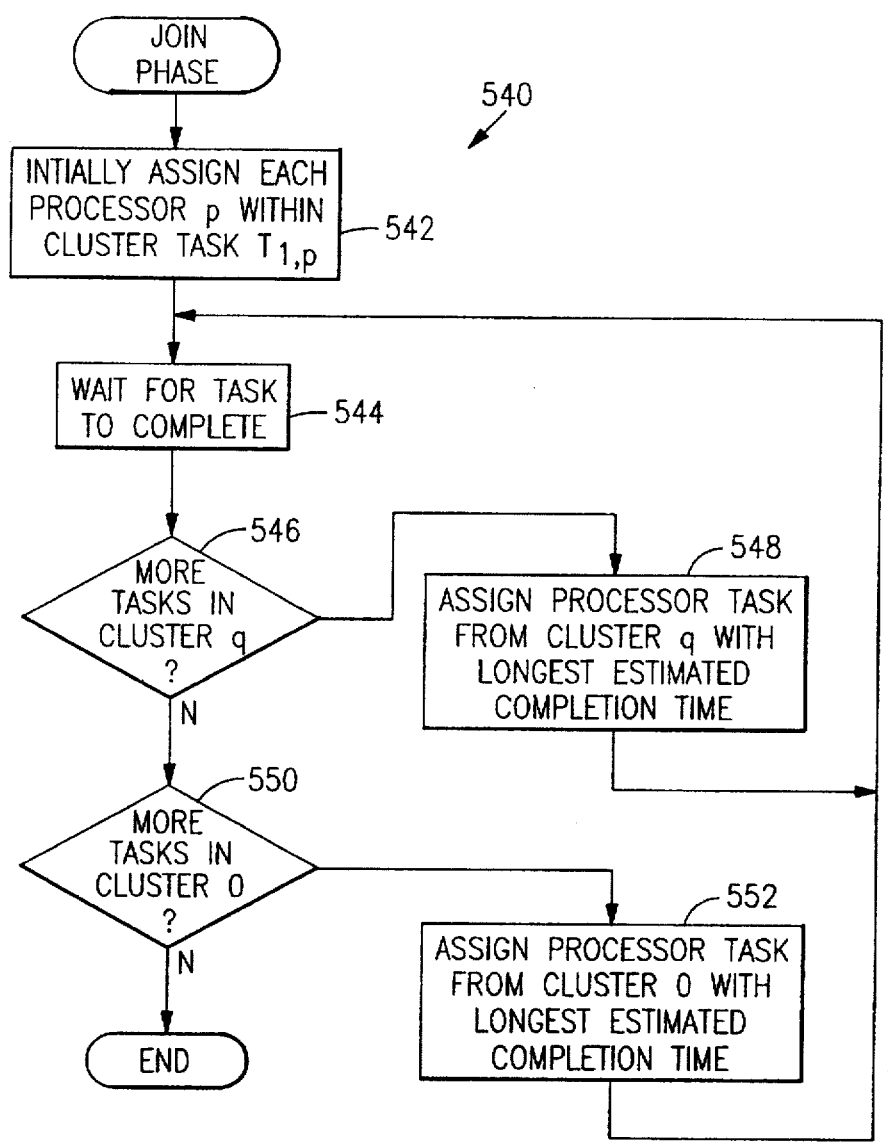
FIG. 9 is a flowchart of the join phase of the sequence shown in FIG. 5.
Figure 10A:
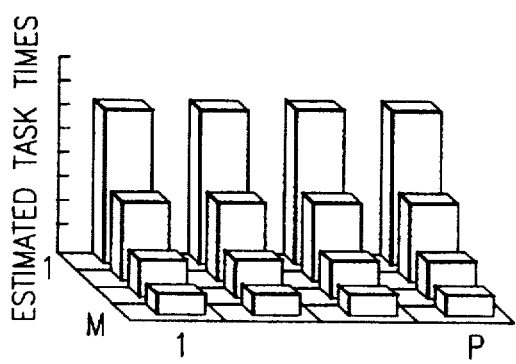
FIG. 10A is a three-dimensional (3D) graph of the estimated task completion time as it varies among tasks.
Figure 10B:
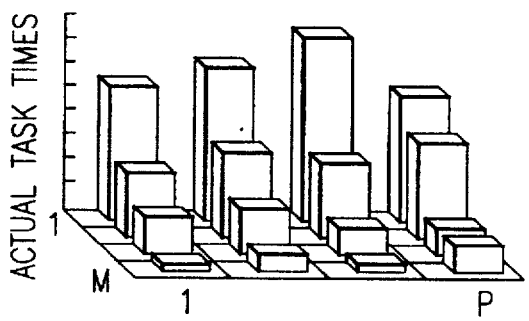
FIG. 10B is a 3D graph of the actual task completion time as it varies among tasks.

Referring to FIG. 9, in the join phase 540, each processor p (104) within a particular cluster is initially assigned task $T_{1,p}$ (step 542). The processors 104 perform the tasks assigned to them in a conventional manner that 30 does not form part of the present invention. Subsequent tasks $T_{m,p}$, where m>1, are assigned dynamically as the initially assigned tasks are completed. Thus, upon the completion of a task (step 544), a determination is made of whether there are any remaining tasks in that cluster 102 that have not been assigned (step 546). If so, then an available processor 104 in the cluster 102 (e.g., the processor that was executing the just-completed task) is assigned the task $T_{m,p}$ from the cluster with the longest estimated completion time (step 548). In these subsequent assignments, the task $T_{m,p}$ assigned a processor 104 need not have the same index p as the processor; the task need only be one of the tasks that was transferred to the cluster 102 in the transfer phase. The task assignments are in this sense dynamic, since only the cluster 102, not the processor 104, is predetermined (in the transfer phase).

If there are no remaining tasks in the cluster 102 that have not been assigned, a determination is made of whether there are any remaining tasks in the universal cluster 108 that have not been assigned (step 550). If so, then an available processor 104 in the cluster 102 is assigned the task $T_{m,p}$ from the universal cluster 108 with the longest estimated completion time (step 552).

If there are no remaining tasks in either the processor cluster 102 or the universal cluster 108, then scheduling is complete for that query, and the only remaining item in this phase is the actual completion of task processing by the various processors 104, together with any required post-processing steps such as merging the results of the individual tasks and reporting the query results to the user.

The invention has been described with particular reference to a sort merge join. However, as noted above the same principles can also be applied to other query types such as a hash join. Thus, in a hash join, each relation might be correspondingly hashed into P partitions, each of which is in turn further divided into M subpartitions of decreasing size to create MP independent tasks which are transferred to the various clusters 102 and 108.

Particular Partitioning Mechanism

As noted above, any of a number of mechanisms may be used to partition an original query R into sets of independent tasks of decreasing estimated task time for concurrent execution. A particular mechanism in the form of a query processor (QP) is described below.

The problem domain assumes a requester which issues requests for data, in a language such as SQL and one or more data management instances such as a relational database which store data, such as relational tables and provide a language such as SQL -- see D. Chamberlin et al., "SEQUEL 2: A Unified Approach to Data Definition, Manipulation, and Control", *IBM Journal of Research and Development*,vol. 20, no. 6, pp. 560–575 (November 1976), for a further discussion of SQL -- for issuing requests to retrieve such data. For the purposes of explanation, in the description below the SQL language will be used for examples and relational database terminology will be used; however, the procedure is not limited to the relational database scope. The SQL request is denoted as R, and the relational database instances as $DB_1$, $DB_2$, and so on. The request R may involve data stored at any subset or all of $DB_1 \ldots DB_N$, for any number N. Each database provides, upon request, catalog information about the data that it stores. All tables are accessible from any of the $DB_i$ instances, either through multiple processing unit access to the same data -- one example is shared data mechanisms such as described in C. Mohan, "Parallelism in Relational Data Base Systems: Architectural Issues and Design Approaches", *IEEE Proceedings of Distributed and Parallel systems conference*, Dublin, Ireland (July 1990) -- or through replicated copies as described in *Proceedings of the Second International Conference on Parallel and Distributed Information Systems*, San Diego, IEEE Computer Society Press (January 1993) (hereinafter *Proceedings 1993*).

The join request R for data stored in multiple tables is assumed to have the following form or to be transformable through various means to such a form:

SELECT (expressions)
FROM (list of tables)
(rest of query)

where (expressions) are any computation supported by the request language and (rest of query) is an optional phrase, which, if present describes any qualifications about the data or any other computations permitted by the request language. FROM (list of tables) provides in the list of tables the names of two or more tables whose data is being requested. These tables are denoted as $T_1, T_2, T_3, \ldots T_K$. These tables are expected to be among those stored by $DB_1, \ldots DB_N$.

An example of such a join request is the following:

SELECT NAME, SALARY, DEPTNO
FROM EMPLOYEE, DEPT
WHERE EMPLOYEE.ENO = DEPT.MGRENO
ORDER BY 3

Figure 12:
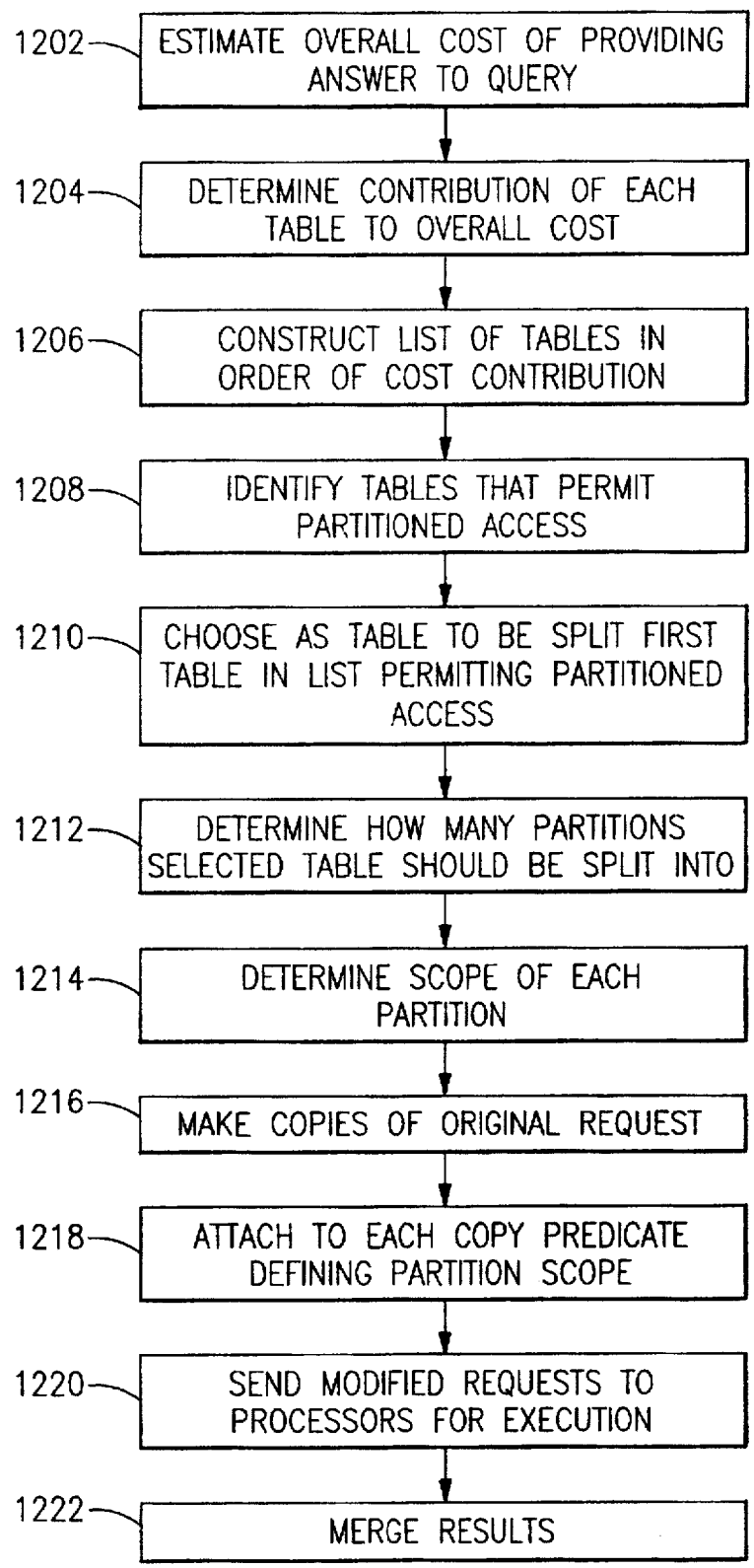
FIG. 12 is a flowchart of the operation of a particular partitioning mechanism for partitioning an original query into sets of independent tasks of decreasing estimated execution time.

Referring to FIG. 12, upon receipt of the original data request R, the QP performs the following steps:

1. The QP examines the FROM (list of tables) contents of the request and estimates the cost of providing the answer to this query (Step 1202). Such an estimate could be provided from many mechanisms that are not part of this invention. One alternative is to execute the query and measure elapsed time, or CPU time, or I/O time, or any combination. Another alternative is to measure or estimate any quantity of importance to the system designer or the requester, such as response time; such a measurement could differ by type of data or requester or time of day, etc. Still another alternative would be to analyze the request using known mechanisms such as those in P. Selinger et al., "Access Path Selection in a Relational Database Management System", *Proceedings of ACM SIGMOD*

Conference, pp. 23–34 (June 1979), or P. G. Selinger et al., "Access Path Selection in Distributed Database Management Systems", *Proceedings International Conference on Data Bases*, Deen and Hammersly (eds.), University of Aberdeen, pp. 204–215 (July 1980), also available as IBM Research Report RJ2883 (August 1980), resulting in an estimated total cost in terms of an arithmetic combination of CPU and I/O and possibly message costs.

2. The QP determines the contribution of each table in the FROM list of tables to the overall cost obtained in step 1, using any one of a variety of techniques (step 1204). One such technique is to use database tools, such as the EXPLAIN mechanism of the IBM DATABASE 2™ (DB®) 3.1 relational database manager, described in the IBM manual *DATABASE 2 Version 3.1 General Information* (GC26-4886-00), which provides a description of the execution of the request plus the costs associated with each table. (DATABASE 2 is a trademark, and IBM and DB2 are registered trademarks, of IBM Corporation.) An alternative technique would be to construct in the QP a cost analyzer that formulates its own estimates of cost and to calculate and record the contribution of each table $T_i$ to the overall cost.

3. The QP constructs a list $L_1, L_2, \ldots, L_K$ of the tables in the request in order of their cost contribution to the overall cost of the request, with the most costly as $L_1$ (step 1206).

4. Next the QP identifies the tables which permit partitioned access (step 1208). This determination can be done with various mechanisms such as using the catalogs of $DB_1, \ldots DB_N$, or any extract of those catalogs which QP itself may keep. In some implementations, all tables may be partitioned, while in others only certain tables may be partitioned. By partitioned access is meant being able to access only a portion of the entire table using database mechanisms. Such mechanisms include indexes or scans on subsets of the table, such as the partitions of DB203.1 described in the above-identified manual or the ROWID predicates of the Oracle relational database manager as described in *Proceedings 1993*, cited above.

5. The QP chooses as the table to be split the first table in the list $L_1, L_2, \ldots L_K$ that also permits partitioned access (step 1210). This table is called $T_j$.

6. Each such $T_j$ will have a means of expressing the partitioned access request. A preferred means is to capture this partitioned access request by use of a predicate or predicates, denoted by $P_j$ that can be attached to the original request in order to narrow that request to a single partition of $T_j$.

7. The QP determines, using mechanisms that do not form part of this invention, how many partitions $T_j$ should be split into, and how to describe the partition scope (step 1212). Such mechanisms might include a predetermined number from the QP or database instance catalogs, the number of working processing units, the number of database instances available, or a computation based on current system load across all of the processing units or database instances. Once selected, the number of partitions for $T_j$ is denoted as $M_j$. ($M_j$ corresponds to MP in the discussion further above.)

8. Given $T_j$ and $M_j$, the QP determines the scope of each partition, using mechanisms that do not form part of this invention (step 1214). One such mechanism might be a list of value ranges for a partitioning index on table $T_j$ in the database or QP catalog; another might be ranges of row IDs defined by an equal number of rows per $M_j$ partitions. The $M_j$ instances of partition scope will be denoted as $P_{j,i}$, i=1 ... $M_j$. Using as an example the query given in the background section, the EMPLOYEE table might have partitioned access using the DEPTNO attribute, with every 10 values in a different partition scope. In this example, then, the partitioned access request $P_j$ would be EMPLOYEE.DEPTNO BETWEEN 1 AND 10, and EMPLOYEE.DEPTNO BETWEEN 11 and 20, etc.

9. QP then makes $M_j$ copies of the original request R (step 1216) and attaches to the ith copy a WHERE clause with the conjunction of the original predicates if any plus the Phd j,i, associated with the ith partition scope of $T_i$ (step 1218). The result of this attachment is denoted the modified request $R_i$.

Using as an example the query given in the background section, the resulting $R_1$ request will have the form:

```
SELECT NAME, SALARY, DEPTNO
FROM EMPLOYEE, DEPT
WHERE EMPLOYEE.ENO = DEPT.MGRENO
AND EMPLOYEE.DEPTNO BETWEEN 1 AND 10
ORDER BY 3
```

Requests $R_2$ through $R_{Mj}$ will have a similar form, with different values for the scope of the partition (e.g., 11 through 20).

The above steps 1–9 are performed in the partition phase 520 (FIGS. 5 and 7) of query processing.

10. Each of the $M_j$ modified requests is sent to a processing unit 104 for execution using mechanisms that do not form part of this invention. This step is performed in the transfer phase 530 (FIGS. 5 and 8) of query processing.

11. Following the join phase 540 (FIGS. 5 and 9), as each of the $M_j$ modified requests returns its result to the QP, the QP performs further activities to merge the results back into a form expected by the requester (step 1222). Such further activities could involve sorting, aggregation, and other processing, for example.

Further modifications can be made to the above procedure to adjust for the choice of access path or overall execution plan for accessing the requested data. For example, an examination after step 9 of the resulting plans for each of the $M_j$ requests may indicate that an unfavorable access path was selected. Or an analysis of the overall costs of each $R_i$ may indicate that $T_j$ was not a suitable candidate table for splitting; for example, a heuristic that the sum of the overall costs of $R_1, R_2, \ldots R_{Mj}$ is more than 2 times the overall cost of the original request R could be used. In these cases, $T_j$ may be rejected as the table to use for partitioning, and list L may be modified to include only those $L_i$'s that follow the $L_i$ that represented $T_j$. Then the process of selecting another table for splitting is begun, starting at step 3 above.

Unlike other possible mechanisms, the procedure described above exploits cost-based knowledge about the request. Furthermore, the procedure allows for the possibility of using the database itself in calculating the costs of the alternative tables in the original request, which will generally provide a better choice of table for splitting than such other mechanisms which are independent of the database engine.

The procedure is capable of using a variety of partitioning access mechanisms, such as indexes or storage partitions, not simply row IDs. Because the procedure allows value-based partition ranges, which may include values in multiple attributes, it is more flexible, allowing more opportunity for optimization and therefore potentially better performance. Because the procedure expresses the split requests in terms of possibly complex predicates that are more nonprocedural than row IDs and less dependent on the physical storage of data by the underlying database instances, the procedure will allow for further transformations and processing, including but not limited to further partitioning and parallelizing and/or distributing the processing of each $R_i$ modified request instance.

Furthermore, using value-based predicates has an inherent advantage over physical addressing schemes such as those that split requests based on row IDs. This is because the use of value-based predicates can be combined with language processors that perform transitive closure on predicates to result in splitting requests on possibly more than one table at a time without an exponential number of resulting requests. For example, in a join request that links 4 tables on the same attribute (e.g., t1.x=t2.x and t2.x=t3.x and t3.x=t4.x) the work on all four tables will be split if the request is split on the x attribute of any of the tables.

Conclusion

Various modifications may be made to the system described above, as described, for example, in the concurrently filed application entitled "Task Scheduler for a Multiprocessor System," now U.S. Pat. No. 5,437,032. Thus, as already noted, each of the elements denominated as a "processor" may be a tightly coupled processor complex rather than a uniprocessor. Further, each processor (uniprocessor or processor complex) may support a plurality of concurrently executing tasks rather than only a single task as described above. In such a case, each processor would be initially assigned a plurality of tasks, in accordance with the desired multiprogramming level, rather than only a single task as described above, and would be assigned new tasks as necessary to maintain such desired multiprogramming level.

In addition, in assigning awaiting tasks, other factors such as the "affinity" of a task for a particular processor may be taken into account. Also, in a system in which multiple queries are being processed concurrently, tasks from different queries might be prioritized and executed concurrently in accordance with a desired scheme for ensuring "fairness" and avoiding undue starvation of low-priority tasks. Still other modifications will be apparent to those skilled in the art.

What is claimed is:

1. In a system having a plurality of processors, a plurality of partially shared storage facilities, and a universal storage facility, each of said partially shared storage facilities being shared by a particular subset of said plurality of processors, each of said processors sharing at least one of said partially shared storage facilities, said universal storage facility being shared by all of said processors, a method of performing a parallel operation on a data set comprising the steps of:

(a) partitioning said operation into a plurality of independent tasks having different estimated completion times, each of said tasks being restricted to a corresponding subset of said data set;

(b) assigning a predetermined subset of said plurality of tasks having smaller estimated completion times to said universal storage facility;

(c) assigning the remaining tasks of said plurality of tasks to said partially shared storage facilities, said remaining tasks having larger estimated completion times;

(d) initially assigning each of said processors a task from a partially shared storage facility shared by said processor for performance of said operation thereon;

(e) upon the completion of a task by one of said processors, assigning that processor an awaiting task from a partially shared storage facility shared by said processor if any awaiting tasks remain in said partially shared storage facility, otherwise, assigning said processor an awaiting task from the universal storage facility; and (f) repeating the preceding step (e) until each of said tasks has been assigned to one of said processors.

2. The method of claim 1 wherein upon the completion of a task by one of said processors, that processor is assigned an awaiting task from a partially shared storage facility shared by said processor or from the universal storage facility having the longest estimated completion time.

3. The method of claim 1 wherein each of said partially shared storage facilities is shared by a plurality of processors.

4. In a system having a plurality of processor clusters, each of said processor clusters containing one or more processors and a cluster storage facility shared by the processors of that cluster, and a universal cluster comprising a shared storage facility shared by all of said processors, a method of performing a parallel operation on a data set comprising the steps of:

(a) partitioning said operation into a plurality of independent tasks, each of which is restricted to a corresponding subset of said data set;

(b) assigning a predetermined subset of said plurality of independent tasks to said universal cluster;

(c) assigning the remaining tasks of said plurality of independent tasks to said processor clusters;

(d) initially assigning each of said processors a task from the corresponding processor cluster for performance of said operation thereon;

(e) upon the completion of a task by one of said processors, assigning that processor an awaiting task from the corresponding processor cluster if any awaiting tasks remain in said processor cluster, otherwise, assigning the processor an awaiting task from the universal cluster; and (f) repeating the preceding step (f) until each of said tasks has been assigned to one of said processors.

5. The method of claim 4 wherein each of said processor clusters contains a plurality of processors.

6. The method of claim 4 wherein said steps of assigning tasks to said clusters comprise the step of transferring the corresponding subsets of said data set to said clusters.

7. The method of claim 4 wherein tasks having smaller estimated completion times are assigned to said universal cluster while tasks having larger estimated completion times are assigned to said processor clusters.

8. The method of claim 4 wherein said processors are assigned awaiting tasks having the longest estimated completion times.

* * * * *